United States Patent [19]

Hopps

[11] Patent Number: 4,905,399
[45] Date of Patent: Mar. 6, 1990

[54] FISHING ROD AND REEL

[76] Inventor: David Hopps, 4492 Camino de la Plaza #133, San Ysidro, Calif. 92073

[21] Appl. No.: 301,908

[22] Filed: Jan. 26, 1989

[51] Int. Cl.⁴ ............................................. A01K 87/06
[52] U.S. Cl. ........................................... 43/20; 43/22; 242/227
[58] Field of Search ......................... 43/20, 22; 403/97; 242/84.1 R, 84.1 A, 84.1 B, 84.1 C, 84.1 D, 84.2 R, 84.2 A, 84.2 B, 84.2 C, 84.2 D

[56] References Cited

U.S. PATENT DOCUMENTS

| 2,165,460 | 5/1937 | Desing | 403/97 |
| 2,711,292 | 6/1955 | Taggart et al. | 43/22 |
| 3,410,016 | 11/1968 | Arsenault | 43/22 |
| 3,419,992 | 1/1969 | Strahm | 43/20 |
| 3,564,752 | 2/1971 | Catignani | 43/22 |
| 4,196,610 | 4/1980 | Chilton | 403/97 |

FOREIGN PATENT DOCUMENTS 1036591 4/1953 France ............................. 242/241

Primary Examiner—Nicholas P. Godici
Assistant Examiner—Michael William Starkweather
Attorney, Agent, or Firm—John B. Dickman, III

[57] ABSTRACT

An improved spinning reel having a support fixed to the rear body for mounting on a fishing rod. The support allows the reel to be mounted on a rod in the same position as prior art reels are mounted, and without interfering with the gripping of the rod.

4 Claims, 2 Drawing Sheets

FISHING ROD AND REEL

BACKGROUND OF THE INVENTION

The present invention relates to fishing reels and the manner in which they are mounted on fishing rods, and in particular to a spinning reel with an improved mount.

Heretofore, fishing reels included the old casting reel with it's spool perpendicular to the rod and a mount which positioned the reel in juxtaposition on the rod in front of the hand, the fly fishing reel with it's perpendicular spool mounted on the rear of the handle, and the spinning reel with it's parallel spool and a mount which positioned the reel on the handle at a comfortable distance to allow a fisherman's hand to be positioned around the handle and in-between the reel and the handle. Each of the reel mounts, used in association with it's particular reel presents handling problems, The casting reel requires two hands to operate the reel, one to hold the rod and the other to touch the fishing line in order to detect a bite. Whereas, the fly fishing reel frees one hand for both holding the rod and touching the fishing line and it allows the other hand to pay out the line or wind it in. The fly fishing reel and the casting reel are limited by their perpendicular spools which do not control the line nearly as well as the spinning reel.

The spinning reel, while it is the reel of choice by most fishermen, has a positioning problem. When the reel is mounted on a rod, the T-shaped support is right where the user's hand should be, thereby forcing the user to accomodate the support between one or more fingers. This may not be a problem for all fishermen, but for those with small hands or those who wear rings, the support presents a problem. The only prior art patent that remotely addresses the problem, is U.S. Pat. No. 2,648,505 which shows a finger grip in front of the support. However, even the grip in 2,648,505 requires positioning the user's hand with fingers in front and behind the support.

U.S. Pat. No. 4,108,392, shows the T-shaped support employed with prior art spinning reels, with the exception that the support adjusts to narrow or lengthen the distance from the rod to the reel.

The present invention overcomes the problems with the prior art, providing an improved support that allows unhampered holding of the rod and touching the line with the same hand.

SUMMARY OF THE INVENTION

The present invention is directed to a support for a spinning rod which places the support out of the user's way without relocating the reel. To accomplish this, the support is fixed to the reel in such a manner that the user's hand is placed between the reel and the rod similar to prior spinning reels without interfereing with the user's hand. Hence, the improved reel has the support fixed to the rear portion of the rod mount and the rear of the reel, not to the middle of it as has been commonly done heretofore. The support still mounts to the same section of the rod handle but because of its improved support, the reel is positioned where it is normally placed and there is no finger interference.

The support may have several different configurations, however it must have a rod engaging position and a vertically extending portion which is fixed to the reel. Generally a C-shaped or L-shaped support works best. With the C-shaped support the distance between the rod and reel is fixed, however the L-shaped support allows the distance to be changed.

It is therefore the primary object of this invention to provide a spinning reel with rear mounted support for positioning the reel on a rod so that the reel can be handled without interference from the support.

A further object is to provide a spinning reel support which can be adjusted to change the distance from the rod to the reel.

Another object is to provide a spinning reel which can be used with several different rods.

IN THE DRAWINGS

DESCRIPTION OF THE PREFERRED EMBODIMENT

Figure 1:
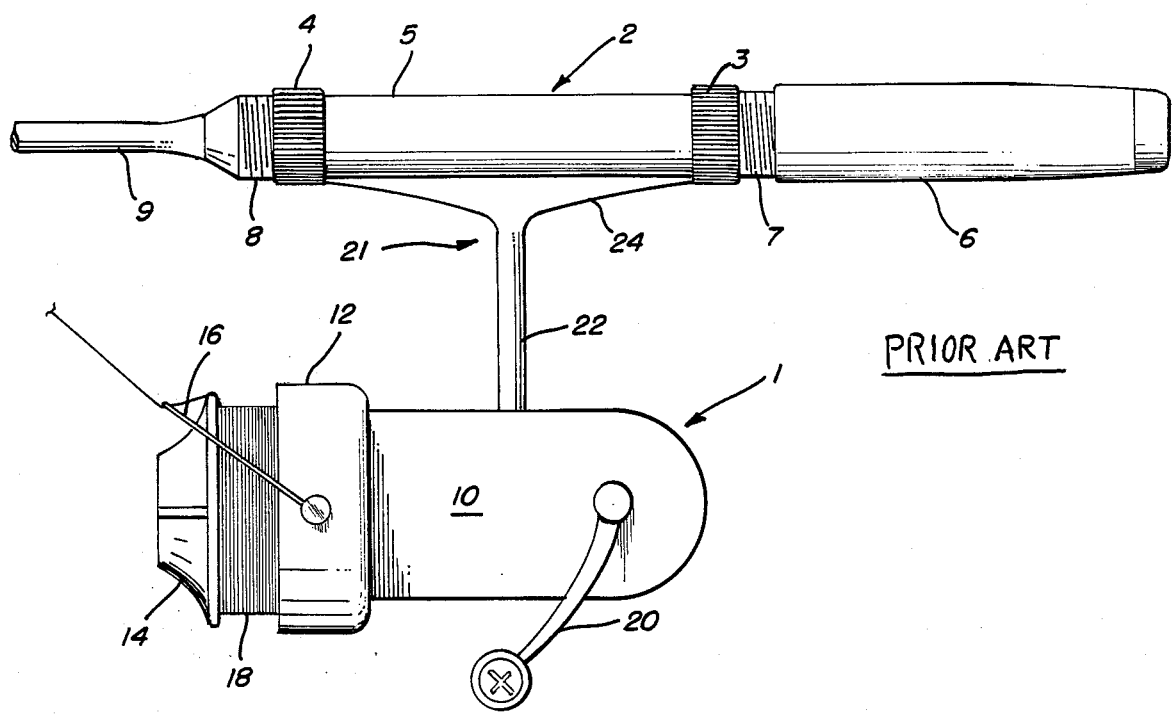
FIG. 1 shows an old style spinning reel mounted on a rod and having a T-shaped support.

Referring to the drawings in detail, there is shown in FIG. 1 a prior art spinning reel 1 mounted to a fishing rod 2 by a T-shaped support 21. The reel 1 includes a body 10, a spool housing 12, a spool 14 and a bail 16. The line bail 16 is locked open to allow the line to reel off the spool when casting. A finger placed on the rim of the spool is used to control the paying out of the fishing line. A turn of the crank rotates and flips the bail 16 over the spool, snagging and winding the line onto the stationary spool. Handle 20 controls the winding of line 18 back on the spool 14. Midway of the body 10 there is a support member 22 which extends perpendicularly from the reel. A cross member 24 is integral with the support member 22 and forms a T-shape therewith.

The conventional fishing rod 2 has two handle sections 5 and 6 and a whip-like rod 9. A pair of threaded elements 7 and 8 are separated by handle section 5, and each of the threaded elements 7 and 8 have lock nuts 3 and 4, respectively. The cross member 24 of the T-shaped support is mounted on the rod by threading the nuts 3 and 4 toward each other. The reel 1 is removed by reversing the direction of the nuts.

Figure 2:
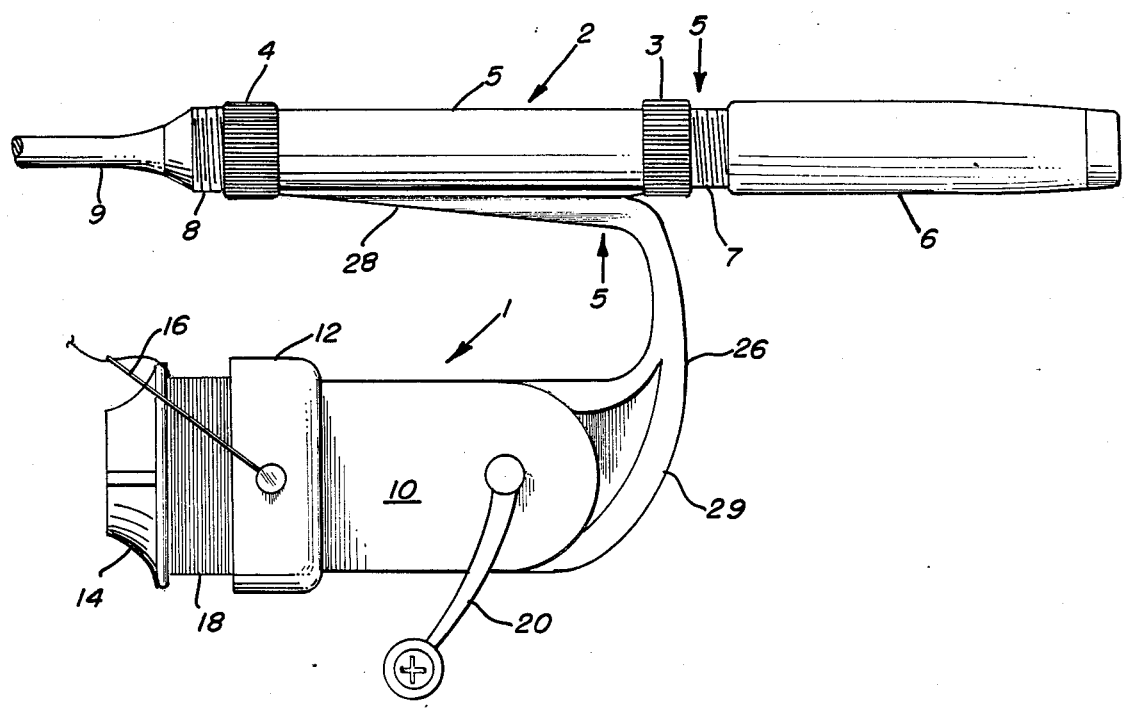
FIG. 2 shows my improved spinning reel with a rear mounted support.
Figure 3:
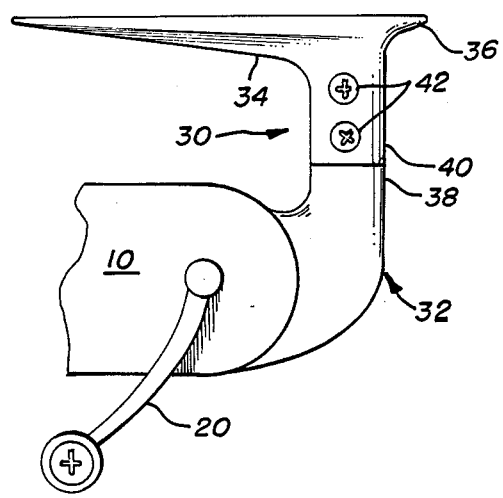
FIG. 3 shows another embodiment of the improved spinning reel with a rear mounted support.
Figure 4:
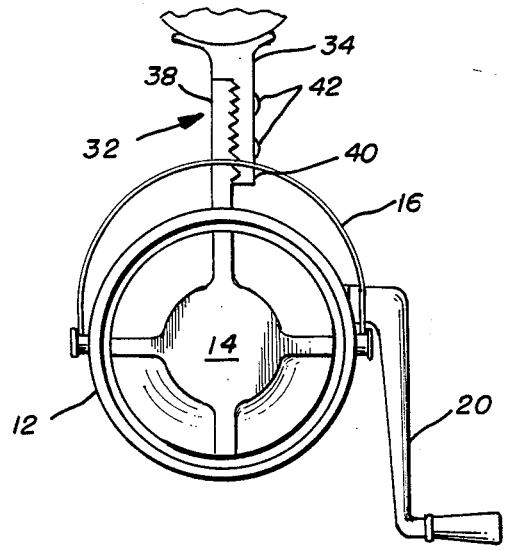
FIG. 4 shows a front plan of FIG. 3.

FIG. 2 shows an improved spinning reel 1 which has the same parts and numbers as the reel in FIG. 1, with the exception of the support 26 which forms the present invention. The fishing rod 2 also has the same numbered parts since the reel body and rod do not form parts of the invention.

Figure 5:
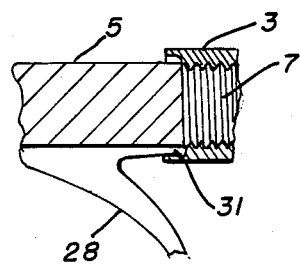
FIG. 5 shows a sectional view taken along the line 5-5 of FIG. 2.

In FIG. 2, spinning reel 1 has a support 26 fixed to the rear of body 10 and a tail end 28 mounted on rod 2, similar to the cross member 24 of support 21 (FIG. 1). Support 26 is C-shaped with a relatively long tail end 28 to enable the reel 1 to be positioned at the same place as prior art reels. The upper end 29 of support 26 is built-up to provide sufficient support for the reel 1. There is a support end 31 which extends from the tail end of the support 26 to engage lock nut 3, see FIG. 5.

When the reel 1 with its improved support 26 is mounted on fishing rod 2, the fishermen can use the reel just like they did with prior art reels and not have any interference from the support 26.

FIG'S. 3 and 4 show another embodiment of the spinning reel support where an L-shaped support 30 is fixed to a reel body 10. The lower leg 34 of the support has a support projection 36 for engaging a lock nut 3 on rod 2. Vertical leg 32 of support 30 has two sections 38 and 40. Each section has serrated teeth which interact with the teeth on the other section to form a positive gripping action, using screws 42 to clamp the sections together. The distance between the rod 2 and reel 1 can be adjusted to accomodate different size hands by moving one section relative to the other and clamping them together.

While only two embodiments of the invention have been shown, it is understood that one skilled in the art using the present disclosure may realize other embodiments, therefore one should consider the invention by studying the drawings, disclosure and claims.

FIG. 2 shows an improved spinning reel 1 which has the same parts and numbers as the reel in FIG. 1, with the exception of the support 26 which forms the present invention. The fishing rod 2 also has the same numbered parts since the reel body and rod do not form parts of the invention.

In FIG. 2, spinning reel 1 has a support 26 fixed to the rear of body 10 and a tail end 28 mounted on rod 2, similar to the cross member 24 of support 21 (FIG. 1). Support 26 is C-shaped with a relatively long tail end 28 to enable the reel 1 to be positioned at the same place as prior art reels. The upper end 29 of support 26 is built-up to provide sufficient support for the reel 1. There is a support end 31 which extends from the tail end of the support 26 to engage lock nut 3, see FIG. 5.

When the reel 1 with its improved support 26 is mounted on fishing rod 2, the fishermen can use the reel just like they did with prior art reels and not have any interference from the support 26.

FIG'S. 3 and 4 show another embodiment of the spinning reel support where an L-shaped support 30 is fixed to a reel body 10. The lower leg 34 of the support has a support projection 36 for engaging a lock nut 3 on rod 2. Vertical leg 32 of support 30 has two sections 38 and 40. Each section has serrated teeth which interact with the teeth on the other section to form a positive gripping action, using screws 42 to clamp the sections together. The distance between the rod 2 and reel 1 can be adjusted to accomodate different size hands by moving one section relative to the other and clamping them together.

While only two embodiments of the invention have been shown, it is understood that one skilled in the art using the present disclosure may realize other embodiments, therefore one should consider the invention by studying the drawings, disclosure and claims.

I claim:

1. An improved fishing reel having a support for mounting on a fishing rod, comprising; a spinning reel having a body, a spool casing and a spool, support means fixed to said reel body to project generally vertically therefrom and then parallel therewith to form an opening in which a hand may be placed without interference from said support means, said support means having means for engaging locking means on a fishing rod, said support means being L-shaped with an extended lower leg means, said L-shaped support means having a vertical leg means having adjusting means to change the distance between said reel and said lower leg means, said adjusting means lying between the two parallel axes of the rod and reel and increasing or decreasing the distance between these two parallel axes.

2. An improved fishing reel as in claim 1 wherein said vertical leg means includes a first section and a second section with positive gripping means to hold the two sections together.

3. An improved fishing reel as in claim 1 wherein said L-shaped support means has a projection extending from said lower leg means at the point where said lower leg means joins said vertical leg means.

4. An improved fishing reel having a support for mounting on a fishing rod, comprising; a spinning reel having a body, a spool casing and a spool, support means fixed to said reel body to project generally vertically therefrom and then parallel therewith to form an opening in which a hand may be placed without interference from said support means, said support means having means for engaging locking means on a fishing rod, said support means being C-shaped with an extended lower leg means, said C-shaped support means having a vertical leg means having adjusting means to change the distance between said reel and said lower leg means, said adjusting means lying between the two parallel axes of the rod and reel and increasing or decreasing the distance between these two parallel axes.

* * * * *